Patented June 12, 1934

1,962,485

UNITED STATES PATENT OFFICE 1,962,485

GAS PURIFICATION

Josef G. Dely, New York, N. Y., assignor to Chemical Engineering Corporation, New York, N. Y., a corporation of Delaware No Drawing. Application January 6, 1931, Serial No. 506,974

2 Claims. (Cl. 23—2)

My invention relates to the purification of gases and more particularly to the catalytic treatment of gas mixtures prior to their purification by fractionation at low temperatures.

The method of separating various constituents of a gas mixture by low temperature cooling and fractional condensation is well known and in common use. One application of this method is the preparation of hydrogen or hydrogen nitrogen mixtures for ammonia synthesis from such industrial gases as coke oven gas, water gas, cracked coke oven gas or cracked natural gas. These gases, which are composed principally of hydrocarbons, hydrogen, nitrogen and carbon oxides, are compressed to a pressure in the neighbourhood of 12 atm. washed with water and caustic solution to remove the carbon dioxide and other acidic impurities and then cooled progressively to a temperature in the neighbourhood of —185° C. During this cooling hydrocarbons and carbon monoxide are liquefied and separated from the gas mixture and the residual gas consists principally of hydrogen. Nitrogen may be introduced either during or after liquefaction process to give a gas containing one volume nitrogen to three volumes hydrogen suitable for ammonia synthesis.

Such industrial gases contain small amounts of nitrogen oxides, oxygen, and unsaturated hydrocarbons, which are negligible and without importance in many uses but which constitute a menace to life and property when the gases are to be subjected to the above described low temperature treatment. During the cooling of the gases the vapour pressures of the various constituents are lowered and the nitrogen oxides and unsaturated hydrocarbons are condensed from the gas mixture and are deposited in that part of the apparatus where the partial pressure of these constituents with gas mixture is higher than the vapour tension at equilibrium with the surrounding conditions of temperature. At ordinary temperatures the oxidation of the nitrous oxide to the higher oxides takes place slowly but at low temperatures the oxidation is rapid even at low concentrations. In the presence of unsaturated hydrocarbons such as acetylene; and oxygen the nitrous oxide forms unstable or explosive compounds the brisance of which is similar to nitroglycerine. The sudden detonation of these explosive compounds has occurred frequently with considerable damage to life and property.

I have found that these explosions can be avoided entirely if the gases are subjected to proper treatment with a suitable catalyst prior to being subjected to the low temperature rectification. I have found that a catalyst containing copper and nickel operating within the temperature range 150°–350° C. will accomplish the reduction to nitrogen and water of the nitrogen oxides and oxygen present in the gases and at the same time hydrogenate the unsaturated hydrocarbons to such a degree of completeness that the subsequent low temperature treatment may be carried on with absolute safety. I have found that catalysts consisting entirely of copper or entirely of nickel are suitable also for the reduction of oxygen and nitrogen oxides but the pure nickel catalyst has the disadvantage of promoting the reaction between carbon monoxide and hydrogen in case these gases are present in the mixture to be purified.

One preferred catalyst, which I have found, contains 1% of copper metal and 4% of nickel metal deposited on a carrier such as pumice. In making this catalyst I dissolve one part metallic copper and four parts metallic nickel in nitric acid and evaporate to dryness to drive off the excess of nitric acid and water. The copper and nickel nitrates are dissolved in a small quantity of hot water and ninety five parts of clean granulated pumice with grain size of about 5 mm. are added to the solution of nitrates. The mass is stirred until the entire solution is taken up by the pumice. It is of advantage to apply a vacuum to the mass to obtain a more complete penetration of the solution into the pumice. The mass is then dried and ignited at a temperature not exceeding 400° C. and then reduced at a lower temperature not exceeding 300° C. 25 cc. of this catalyst operating at a temperature of 300° C. and at a pressure of 16 atm. will take care of 150 liters of gas per hour (measured at 0° C. and 760 mm. Hg.).

Another preferred catalyst can be prepared according to the directions given above using 1% nickel and 4% copper.

The catalysis may take place directly before the low temperature rectification and at the pressure at which the rectification takes place or it may be placed prior to the step of carbon dioxide removal or it may take place prior to compression of the gases. The usual methods of maintaining the catalyst temperature may be employed, comprising heat exchangers to preheat the gases on the way to the catalyst by means of the hot gases leaving the catalyst and an electric heater to maintain the catalyst temperature.

I claim as my invention:—

1. The process for the elimination of nitrogen oxides and unsaturated hydrocarbons from industrial hydrogen gas mixtures containing them which consists in passing said gases over a catalyst containing a metal selected from the group consisting of copper and nickel at temperatures higher than 150° C. to decompose the nitrogen oxides and convert the unsaturated hydrocarbons to saturated hydrocarbons.

2. The process for the purification of gas mixtures containing nitrogen oxides, unsaturated hydrocarbons, carbon monoxide, and hydrogen which consists in passing a gas containing these materials over a catalyst containing copper and nickel at temperatures between 150° and 350° C. and thereby decomposing the nitrogen oxides and converting the unsaturated hydrocarbons to saturated hydrocarbons.

JOSEF G. DELY.